E. S. SCHEBLE.
STEERING GEAR.
APPLICATION FILED SEPT. 10, 1918.
1,320,278. Patented Oct. 28, 1919.
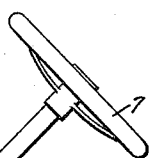
Fig. 1.
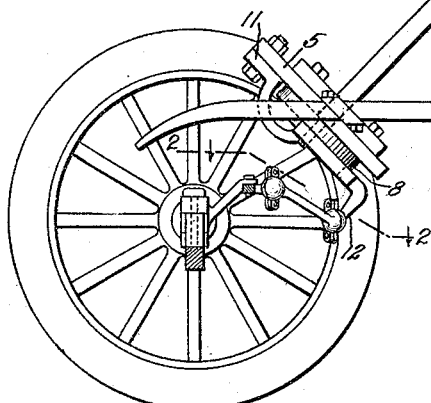
Fig. 2.
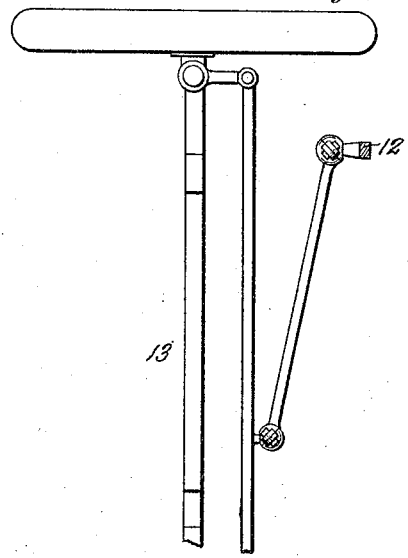
Fig. 3.
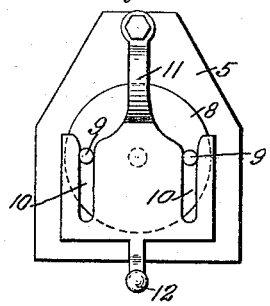
Fig. 4.
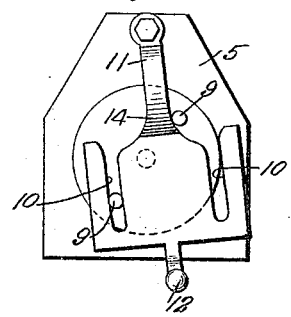
WITNESSES
Arthur Frisch
BJoffe
INVENTOR
E. S. Scheble
BY
ATTORNEYS

UNITED STATES PATENT OFFICE.

EUGENE STILES SCHEBLE, OF CLEBURNE, TEXAS.

STEERING-GEAR.

1,320,278.  Specification of Letters Patent.  Patented Oct. 28, 1919.

Application filed September 10, 1918. Serial No. 253,423.

*To all whom it may concern:*

Be it known that I, EUGENE STILES SCHEBLE, a citizen of the United States, residing at Cleburne, in the county of Johnson and State of Texas, have invented a new and Improved Steering-Gear, of which the following is a full, clear, and exact description.

This invention relates to steering mechanism and has for its general object to provide a comparatively simple, inexpensive and effective steering mechanism which will positively prevent shocks being transmitted to the steering wheel when the car is traveling straight ahead, but which permits of easy steering of the vehicle.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a longitudinal section on the front part of an automobile equipped with a steering mechanism embodying my invention;

Fig. 2 is a fragmentary horizontal section on line 2—2, Fig. 1;

Fig. 3 is a bottom-side-up view of my steering mechanism, the same being shown in neutral position; and Fig. 4 is a view similar to that shown in Fig. 3 with the parts shown relatively moved.

Referring to the drawings, 5 is a bed having means whereby the same can be secured at an angle suitable for presenting the steering column 6 in a position to conveniently manipulate the steering wheel 7 or any other member that may be used for steering purposes. The end of the steering column carries a disk 8 constrained to revolve with the steering wheel 7. The disk carries a pair of diametrically opposite pins 9 which enter grooves 10 of a pendulum 11. The grooves are open at one end, and one of the pins will progress farther into a groove while the other passes out of the groove when the pendulum is oscillated by means of the disk as the disk is turned by the steering wheel 7.

The free end 12 of the pendulum is arranged to be connected to any motion-transmission means which may be connected to a running gear or rudder. As shown in the drawings, the end 12 is connected to rods for operating the steering gear 13 of the vehicle, shown in Figs. 1 and 2.

To give a large swinging arc to the pendulum, a portion 14 of same is raised to allow one of the pins 9 to pass under as the other moves the pendulum to one side. This arrangement allows a large displacement of the steering means of a machine by means of a simple mechanism which is sure in operation and in which there is little chance for play which would render the control dangerous.

When the parts are in the position shown in Fig. 3, the front steering wheels are directed straight ahead, and they cannot shift because the pendulum 11 cannot swing about its pivotal center because of the engagement of the pins 9 in the parallel slots 10, and when it is desired to turn, one pin moves out of its slot and the other pin moves farther into its slot and acts as a cam to move the pendulum in the direction desired. It will thus be seen that the steering device locks the steering wheels for straight ahead travel and automatically unlocks the steering wheels and permits them to turn as the controller 7 is turned by the driver.

I claim:

1. In a steering mechanism, a bed, a steering rod mounted in the bed, a disk on the steering rod and having diametrically opposite pins, and a member pivoted at one end to the bed and adapted to have its other end connected with motion transmission means, said member being provided with slots in which the pins of the disk work.

2. In a steering mechanism, a bed, a steering rod mounted in the bed, a disk on the end of the steering rod and provided with diametrically opposite pins, a pendulum pivoted to the upper portion of the bed and having a widened portion provided with slots open at one end and with which the pins engage, and a steering gear connected with the lower end of the pendulum.

3. In a steering mechanism, a bed, a steering rod having one end projecting through the bed, a disk on the projecting end of the rod and provided with oppositely arranged pins, and a pendulum having a reduced portion projecting from each end, one of the reduced portions having an off-set and being pivoted to the bed and the other being adapted for connection with motion transmission means, the pendulum being provided with open slots receiving the pins of the disk.

EUGENE STILES SCHEBLE.

Copies of this patent may be obtained for five cents each, by addressing the "Commissioner of Patents, Washington, D. C."